United States Patent
George et al.

(10) Patent No.: US 8,836,164 B2
(45) Date of Patent: Sep. 16, 2014

(54) POLYPHASE POWER MANAGEMENT SYSTEM FOR TELECOMMUNICATIONS EQUIPMENT SITE POWER PLANT AND METHOD OF OPERATION THEREOF

(75) Inventors: Binu George, Whitefield Road (IN); Ramasamy Narayanan, Mahadevapura (IN); Vinod Kanna Rajkumar, Vidyaranyapura (IN); Sudhakara Reddy Vaka, Kundalahalli (IN); Prashanth Venkatesh, Mathikere (IN)

(73) Assignee: General Electric Company, Schenectady, NY (US)

(*) Notice: Subject to any disclaimer, the term of this patent is extended or adjusted under 35 U.S.C. 154(b) by 524 days.

(21) Appl. No.: 13/313,366

(22) Filed: Dec. 7, 2011

(65) Prior Publication Data

US 2012/0146411 A1     Jun. 14, 2012

Related U.S. Application Data

(60) Provisional application No. 61/421,662, filed on Dec. 10, 2010.

(51) Int. Cl.
*H02J 3/46* (2006.01)
*H02J 9/06* (2006.01)
*H02J 9/08* (2006.01)

(52) U.S. Cl.
CPC .. *H02J 9/08* (2013.01); *H02J 9/061* (2013.01)
USPC ............... 307/64; 307/23; 307/85; 307/86; 307/87

(58) Field of Classification Search
CPC ............... H02J 3/38; H02J 3/46; H02J 9/04; H02J 9/06; H02J 7/00
USPC .................... 307/23, 64, 85, 86, 87
See application file for complete search history.

(56) References Cited

U.S. PATENT DOCUMENTS

| 5,182,464 A | 1/1993 | Woodworth et al. |
| 5,739,594 A | 4/1998 | Sheppard et al. |
| 8,242,630 B2 * | 8/2012 | Tamaki et al. ............ 307/43 |

* cited by examiner

*Primary Examiner* — Hal Kaplan
(74) *Attorney, Agent, or Firm* — General Electric Company

(57) ABSTRACT

A polyphase power management system (PMS) and a method of operating the same. In one embodiment, the PMS includes: (1) a switching unit having a polyphase mains input with a neutral, a backup power input, a rectifier output and an other loads output, (2) a mains monitor/controller coupled to the switching unit and configured to monitor the polyphase mains input and route various phases of the polyphase mains input or the backup power input to the rectifier output and the other loads output based on the number of phases that are nominal at the polyphase mains input.

20 Claims, 2 Drawing Sheets

Figure 1:
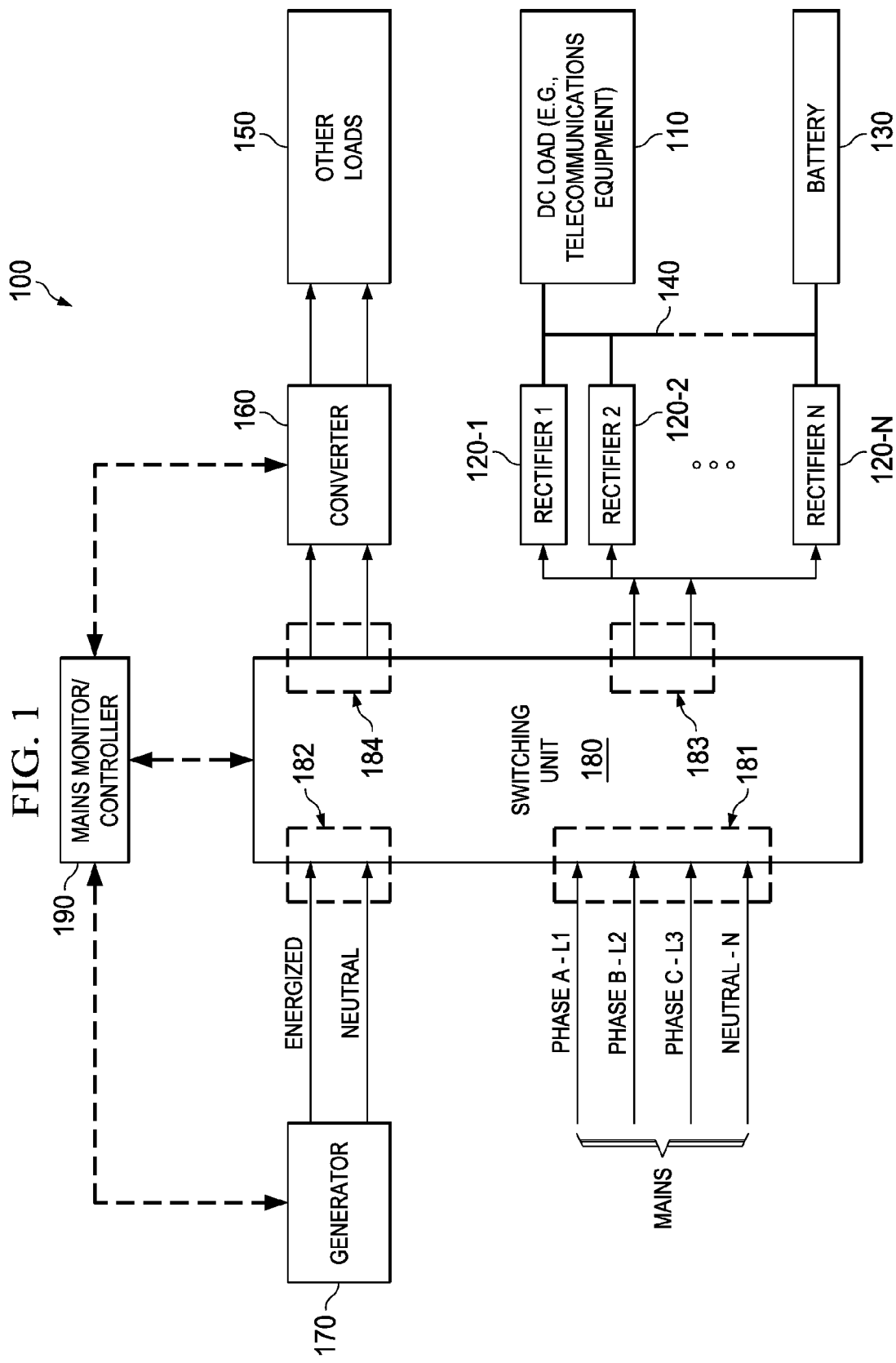

POLYPHASE POWER MANAGEMENT SYSTEM FOR TELECOMMUNICATIONS EQUIPMENT SITE POWER PLANT AND METHOD OF OPERATION THEREOF

CROSS-REFERENCE TO RELATED APPLICATION

This application claims the benefit of U.S. Provisional Application Ser. No. 61/421,662, filed by Narayanan, et al., on Dec. 10, 2010, entitled "Power Optimizer," commonly assigned with this application and incorporated herein by reference.

TECHNICAL FIELD

This application is directed, in general, to a power management for sites employing a backup generator and, more specifically, to a polyphase power management system for the power plant of a telecommunications equipment site and a method of operating the same.

BACKGROUND

Today's telecommunications equipment sites employ a power management system (PMS) to which three-phase mains power is provided. Conventional PMS evaluates the three phases, converts what it regards as the two best phases into single-phase power and uses the single-phase power to run the equipment (e.g., telecommunications equipment and other loads, such as air conditioning equipment) at the site. If two of the mains phases are lost, the PMS causes the equipment at the site to operate on a backup generator.

SUMMARY

One aspect provides a polyphase PMS. In one embodiment, the PMS includes: (1) a switching unit having a polyphase mains input with a neutral, a backup power input, a rectifier output and an other loads output, (2) a mains monitor/controller coupled to the switching unit and configured to monitor the polyphase mains input and route: (2a) at least one nominal phase of the polyphase mains input to the rectifier output and another nominal phase of the polyphase mains input to the other loads output when at least three phases are nominal at the polyphase mains input, (2b) one nominal phase of the polyphase mains input to the rectifier output and another nominal phase of the polyphase mains input to the other loads output when only two phases are nominal at the polyphase mains input, (2c) one nominal phase of the polyphase mains input to both the rectifier output and the other loads output when only one phase is nominal at the polyphase mains input and (2d) the backup power input to both the rectifier output and the other loads output when no phases are nominal at the polyphase mains input.

Another aspect provides a method of operating a polyphase PMS including a switching unit having a polyphase mains input with a neutral, a backup power input, a rectifier output and an other loads output. In one embodiment, the method includes: (1) routing at least one nominal phase of the polyphase mains input to the rectifier output and another nominal phase of the polyphase mains input to the other loads output when at least three phases are nominal at the polyphase mains input, (2) alternatively routing one phase of the polyphase mains input to the rectifier output and another nominal phase of the polyphase mains input to the other loads output when only two phases are nominal at the polyphase mains input, (3) alternatively routing one phase of the polyphase mains input to both the rectifier output and the other loads output when only one phase is nominal at the polyphase mains input and (4) alternatively routing the backup power input to both the rectifier output and the other loads output when no phases are nominal at the polyphase mains input.

Yet another aspect provides a telecommunications equipment site. In one embodiment, the telecommunications equipment site includes: (1) telecommunications equipment, (2) at least one rectifier, (3) at least one battery, (4) a DC bus coupling the telecommunications equipment, the at least one rectifier and the at least one battery and configured to allow the at least one rectifier and the at least one battery to provide power to the telecommunications equipment, (5) other loads, (6) a generator and (7) a polyphase PMS, having: (7a) a switching unit having a polyphase mains input with a neutral, a backup power input coupled to the generator, a rectifier output coupled to the at least one rectifier and an other loads output coupled to the other loads, (7b) a mains monitor/controller coupled to the switching unit and configured to monitor the polyphase mains input and route: (7bi) at least one nominal phase of the polyphase mains input to the rectifier output and another nominal phase of the polyphase mains input to the other loads output when at least three phases are nominal at the polyphase mains input, (7bii) one phase of the polyphase mains input to the rectifier output and another nominal phase of the polyphase mains input to the other loads output when only two phases are nominal at the polyphase mains input, (7biii) one phase of the polyphase mains input to both the rectifier output and the other loads output when only one phase is nominal at the polyphase mains input and (7biv) the backup power input to both the rectifier output and the other loads output when no phases are nominal at the polyphase mains input.

BRIEF DESCRIPTION

Figure 2:
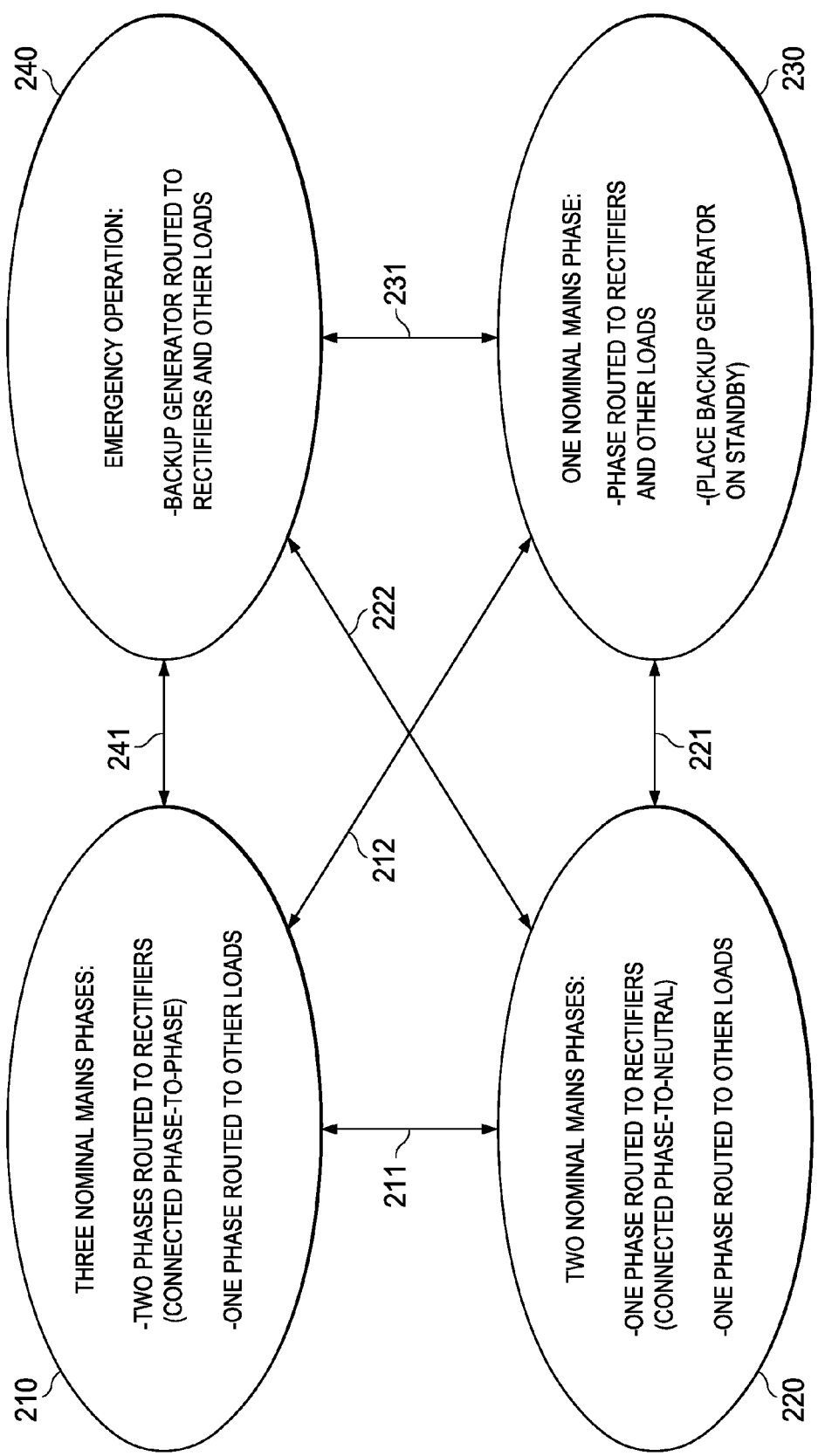

Reference is now made to the following descriptions taken in conjunction with the accompanying drawings, in which:

FIG. 1 is a block diagram of one embodiment of a telecommunications equipment site having a polyphase power management system; and FIG. 2 is a state diagram detailing one embodiment of operating the polyphase power management system of FIG. 1.

DETAILED DESCRIPTION

As stated above, a conventional PMS uses at most only two phases of the three that are provided to it. Further, should two phases be lost, the conventional PMS switches to backup generator operation. It is realized herein that this conventional power management technique resorts to the backup generator unnecessarily. Accordingly, disclosed herein are various embodiments of a polyphase PMS that takes better advantages of all the phases of electricity that are available at a particular site. Accordingly, certain embodiments of the polyphase PMS disclosed herein can operate on any number of phases, from none, to the maximum number available to the PMS. It is further realized herein that, when used at equipment sites having at least one rectifier, this conventional power management technique also fails to take advantage of significant rectifier power output advantages that may be gained. Accordingly, disclosed herein are embodiments of the polyphase PMS that adjusts its routing of power to at least one rectifier such that the power output of the at least one rectifier is enhanced.

FIG. 1 is a block diagram of one embodiment of a telecommunications equipment site 100 having a polyphase power management system. The illustrated embodiment of the telecommunications equipment site 100 includes a DC load that includes telecommunications equipment 110. The illustrated embodiment of the telecommunications equipment site also includes at least one rectifier. In the illustrated embodiment, the at least one rectifier is a plurality of rectifiers 120-1, 120-2, . . . , 120-N coupled in parallel (that is, their inputs and outputs are coupled in parallel). The illustrated embodiment of the telecommunications equipment site also includes at least one battery 130. In one embodiment, the at least one battery is one or more strings of batteries. A DC bus 140 couples the DC load 110, the at least one rectifier 120-1, 120-2, . . . , 120-N and the at least one battery 130. The DC bus 140 is configured to allow the at least one rectifier 120-1, 120-2, . . . , 120-N and the at least one battery 130 to provide power to the DC load 110.

The illustrated embodiment of the telecommunications equipment site also includes other (typically AC) loads 150, which may include, e.g., air conditioning equipment, lighting or security equipment. The illustrated embodiment of the telecommunications equipment site also includes a converter 160 configured to provide converted and regulated power to the other loads 150. The converter 160 is configured to convert power received from the other loads output 184 to power at a voltage suitable for powering the other loads 150. In one embodiment, the converter 160 provides power at about 230 volts, which is suitable for such other loads as air conditioning. The illustrated embodiment of the telecommunications equipment site also includes a generator 170 configured to provide backup power. In one embodiment, the generator 170 is a diesel generator.

The illustrated embodiment of the polyphase PMS includes a switching unit 180 and a mains monitor/controller 190 coupled to the switching unit 180. The illustrated embodiment of the switching unit 180 has a polyphase mains input 181 with a neutral. The polyphase mains input 181 is configured to receive power from mains (typically the commercial utility power grid). In one embodiment, the polyphase mains input 181 is a three-phase input. The illustrated embodiment of the switching unit 180 also has a backup power input 182 coupled to the generator 170, a rectifier output 183 coupled to the at least one rectifier 120-1, 120-2, . . . , 120-N and an other loads output 184 coupled to the other loads 150 (e.g., through the converter 160).

The illustrated embodiment of the mains monitor/controller 190 is configured to monitor the polyphase mains input 181 and control the switching unit 180 such that power is routed therethrough based on at least the status of the phases in the mains. The status of the phases may be regarded as "nominal" or not. For purposes of this disclosure, a "nominal" phase is defined as one suitable for use by the telecommunications equipment site and not degraded in terms of voltage or quality to the degree such that it should be used (i.e., may damage or significantly shorten the life of the equipment being powered). In real-world terms, the phases provided by a commercial utility power grid are usually "nominal," and only cease to be nominal when phases are lost or interrupted.

The illustrated embodiment of the mains monitor/controller 190 is configured to control the switching unit 180 such that at least one nominal phase of the polyphase mains input 181 is routed to the rectifier output 183 and another nominal phase of the polyphase mains input 181 is further routed to the other loads output 184 when at least three phases are nominal at the polyphase mains input 181. For example, if phase A (L1), phase B (L2) and phase C (L3) are nominal, the switching unit 180 may route phase A (L1) and phase B (L2) to the rectifier output 183 and further route phase C (L3) to the other loads output 184. As another example, if phase A (L1), phase B (L2) and phase C (L3) are nominal, the switching unit 180 may route phase B (L2) and phase C (L3) to the rectifier output 183 and further route phase A (L1) to the other loads output 184.

The illustrated embodiment of the mains monitor/controller 190 is further configured to control the switching unit 180 such that one phase of the polyphase mains input 181 is routed to the rectifier output 183 and another nominal phase of the polyphase mains input 181 is further routed to the other loads output 184 when only two phases are nominal at the polyphase mains input 181. For example, if only phase A (L1) and phase B (L2) are nominal, the switching unit 180 may route phase A (L1) to the rectifier output 183 and further route and phase B (L2) to the other loads output 184. As another example, if only phase A (L1) and phase C (L3) are nominal, the switching unit 180 may route phase A (L1) to the rectifier output 183 and further route phase C (L3) to the other loads output 184.

The illustrated embodiment of the mains monitor/controller 190 is yet further configured to control the switching unit 180 such that one phase of the polyphase mains input 181 is routed to both the rectifier output 183 and the other loads output 184 when only one phase is nominal at the polyphase mains input 181. For example, if only phase C (L3) is nominal, the switching unit 180 routes phase C (L3) to both the rectifier output 183 and the other loads output 184.

The illustrated embodiment of the mains monitor/controller 190 is still further configured to control the switching unit 180 such that the backup power input 182 is routed to both the rectifier output 183 and the other loads output 184 when no phases are nominal at the polyphase mains input 181.

In the illustrated embodiment, the mains monitor/controller 190 is coupled to the generator 170 and the voltage converter. This allows the mains monitor/controller 190 to place the generator 170 on standby or turn it off. In one embodiment, the mains monitor/controller 190 is further configured to place the generator 170 on standby when the only one phase is nominal at the polyphase mains input 181. This prepositions the generator in case the remaining phase is lost. Those skilled in the art will understand, however, that it may be advantageous to place the generator 170 on standby under other circumstances as well, such as when phases are only intermittently nominal or suffer a decline in quality such that they may foreseeably fail.

In the illustrated embodiment, the mains monitor/controller is yet still further configured to route at least two nominal phases and the neutral of the polyphase mains input 181 to the rectifier output 183 when at least three phases are nominal at the polyphase mains input 181. In such case, the at least one rectifier 120-1, 120-2, . . . , 120-N is configured to rectify power from a subset of the at least two nominal phases and the neutral based on voltages of the at least two nominal phases.

For example, if phase A (L1), phase B (L2) and phase C (L3) are nominal and the switching unit 180 routes phase A (L1), phase B (L2) and neutral to the rectifier output 183, the at least one rectifier 120-1, 120-2, . . . , 120-N may alternatively (1) rectify power by taking both phase A (L1) and phase B (L2) as inputs (i.e., operating phase-to-phase, which results in a higher input voltage to the rectifiers 120-1, 120-2, . . . , 120-N) or (2) rectify power by taking phase A (L1) and the neutral as inputs (i.e., operating phase-to-neutral, which results in a lower input voltage to the rectifiers 120-1, 120-2, . . . , 120-N). The advantage of operating phase-to-phase is that the higher input voltage allows the rectifiers 120-1, 120-2, . . . , 120-N to produce a higher output power at a derated voltage. However, if the input voltage is excessive, the rectifiers 120-1, 120-2, . . . , 120-N may be damaged. Therefore, in the illustrated embodiment, the rectifiers 120-1, 120-2, . . . , 120-N operate phase-to-phase when the input voltage is at or below a threshold and operate phase-to-neutral when the input voltage is above the threshold. For example, when input voltage is expected to vary between about 90 volts and 300 volts, a suitable threshold may be 170 volts. Accordingly, the rectifiers 120-1, 120-2, . . . , 120-N would operate phase-to-phase when the input voltage is at or below 170 volts and operate phase-to-neutral when the input voltage is above 170 volts.

FIG. 2 is a state diagram detailing one embodiment of operating the polyphase power management system of FIG. 1. FIG. 2 is for three phases and shows four states. FIG. 2 also assumes that the rectifiers 120-1, 120-2, . . . , 120-N of FIG. 1 are capable of operating both phase-to-phase and phase-to-neutral.

A first state 210 applies when all three phases are nominal. A second state 220 applies when only two phases are nominal. A third state 230 applies when only one phase is nominal. A fourth state 240 applies when no phases are nominal (typically regarded as an emergency calling for backup power). State transitions 211, 212, 221, 222, 231, 241 indicate that any state 210, 220, 230, 240 can lead to any other state 210, 220, 230, 240 without having to pass through any intervening state 210, 220, 230, 240.

In the first state 210, two nominal phases of the polyphase mains input are routed to the rectifier output, and one nominal phase of the polyphase mains input is routed to the other loads output. In the second state 220, one phase of the polyphase mains input is routed to the rectifier output, and one nominal phase of the polyphase mains input to the other loads output. In the third state 230, one phase of the polyphase mains input is routed to both the rectifier output and the other loads output when only one phase is nominal at the polyphase mains input. In one embodiment, a backup generator is also placed on standby in the third state 230. In the fourth state 240 (emergency operation), the backup power input is routed to both the rectifier output and the other loads output.

Those skilled in the art to which this application relates will appreciate that other and further additions, deletions, substitutions and modifications may be made to the described embodiments.

What is claimed is:

1. A polyphase power management system, comprising:
   a switching unit having a polyphase mains input with a neutral, a backup power input, a rectifier output and an other loads output;
   a mains monitor/controller coupled to said switching unit and configured to monitor said polyphase mains input and route:
   at least one nominal phase of said polyphase mains input to said rectifier output and another nominal phase of said polyphase mains input to said other loads output when at least three phases are nominal at said polyphase mains input,
   one nominal phase of said polyphase mains input to said rectifier output and another nominal phase of said polyphase mains input to said other loads output when only two phases are nominal at said polyphase mains input,
   one nominal phase of said polyphase mains input to both said rectifier output and said other loads output when only one phase is nominal at said polyphase mains input, and
   said backup power input to both said rectifier output and said other loads output when no phases are nominal at said polyphase mains input.

2. The polyphase power management system as recited in claim 1 further comprising at least one rectifier coupled to said rectifier output, said mains monitor/controller further configured to route at least two nominal phases and said neutral of said polyphase mains input to said rectifier output when at least three phases are nominal at said polyphase mains input, said at least one rectifier configured to rectify power from a subset of said at least two nominal phases and said neutral based on voltages of said at least two nominal phases.

3. The polyphase power management system as recited in claim 2 wherein said at least one rectifier is a plurality of rectifiers coupled in parallel.

4. The polyphase power management system as recited in claim 2 further comprising a DC bus coupling an output of said at least one rectifier to telecommunications equipment and at least one battery.

5. The polyphase power management system as recited in claim 1 further comprising a generator coupled to said backup power input and said mains monitor/controller.

6. The polyphase power management system as recited in claim 5 wherein said mains monitor/controller is further configured to place said generator on standby when said only one phase is nominal at said polyphase mains input.

7. The polyphase power management system as recited in claim 1 further comprising a voltage converter coupled to said other loads output and said mains monitor/controller.

8. A method of operating a polyphase power management system including a switching unit having a polyphase mains input with a neutral, a backup power input, a rectifier output and an other loads output, the method comprising:
   routing at least one nominal phase of said polyphase mains input to said rectifier output and another nominal phase of said polyphase mains input to said other loads output when at least three phases are nominal at said polyphase mains input;
   alternatively routing one phase of said polyphase mains input to said rectifier output and another nominal phase of said polyphase mains input to said other loads output when only two phases are nominal at said polyphase mains input;
   alternatively routing one phase of said polyphase mains input to both said rectifier output and said other loads output when only one phase is nominal at said polyphase mains input; and
   alternatively routing said backup power input to both said rectifier output and said other loads output when no phases are nominal at said polyphase mains input.

9. The method as recited in claim 8 wherein said routing comprises routing at least two nominal phases and said neutral of said polyphase mains input to said rectifier output when at least three phases are nominal at said polyphase mains input, said at least one rectifier configured to rectify power from a subset of said at least two nominal phases and said neutral based on voltages of said at least two nominal phases.

10. The method as recited in claim 9 wherein said at least one rectifier is a plurality of rectifiers coupled in parallel.

11. The method as recited in claim 9 further comprising providing power from said at least one rectifier to telecommunications equipment and at least one battery via a DC bus.

12. The method as recited in claim 8 further comprising controlling a generator coupled to said backup power input with a mains monitor/controller.

13. The method as recited in claim 12 further comprising placing said generator on standby when said only one phase is nominal at said polyphase mains input.

14. The method as recited in claim 8 further comprising controlling a voltage converter coupled to said other loads output via a mains monitor/controller.

15. A telecommunications equipment site, comprising:
   telecommunications equipment;
   at least one rectifier;
   at least one battery;
   a DC bus coupling said telecommunications equipment, said at least one rectifier and said at least one battery and configured to allow said at least one rectifier and said at least one battery to provide power to said telecommunications equipment;
   other loads;
   a generator; and
   a polyphase power management system, including:
   a switching unit having a polyphase mains input with a neutral, a backup power input coupled to said generator, a rectifier output coupled to said at least one rectifier and an other loads output coupled to said other loads;
   a mains monitor/controller coupled to said switching unit and configured to monitor said polyphase mains input and route:
      at least one nominal phase of said polyphase mains input to said rectifier output and another nominal phase of said polyphase mains input to said other loads output when at least three phases are nominal at said polyphase mains input,
      one phase of said polyphase mains input to said rectifier output and another nominal phase of said polyphase mains input to said other loads output when only two phases are nominal at said polyphase mains input,
      one phase of said polyphase mains input to both said rectifier output and said other loads output when only one phase is nominal at said polyphase mains input, and
      said backup power input to both said rectifier output and said other loads output when no phases are nominal at said polyphase mains input.

16. The telecommunications equipment site as recited in claim 15 wherein said mains monitor/controller is further configured to route at least two nominal phases and said neutral of said polyphase mains input to said rectifier output when at least three phases are nominal at said polyphase mains input, said at least one rectifier configured to rectify power from a subset of said at least two nominal phases and said neutral based on voltages of said at least two nominal phases.

17. The telecommunications equipment site as recited in claim 15 wherein said at least one rectifier is a plurality of rectifiers coupled in parallel.

18. The telecommunications equipment site as recited in claim 15 wherein said mains monitor/controller is further configured to place said generator on standby when said only one phase is nominal at said polyphase mains input.

19. The telecommunications equipment site as recited in claim 15 further comprising a voltage converter coupled between said other loads output and said other loads.

20. The telecommunications equipment site as recited in claim 19 wherein said mains monitor/controller is further configured to control said voltage converter.

* * * * *